(12) United States Patent
Horiuchi et al.

(10) Patent No.: US 6,599,654 B2
(45) Date of Patent: Jul. 29, 2003

(54) FUEL CELL AND MULTI-ELEMENT STACK THEREFOR

(75) Inventors: Michio Horiuchi, Nagano (JP); Shigeaki Suganuma, Nagano (JP); Misa Watanabe, Nagano (JP); Shuji Yamazaki, Nagano (JP)

(73) Assignee: Shinko Electric Industries, Co., LTD, Nagano (JP)

( * ) Notice: Subject to any disclaimer, the term of this patent is extended or adjusted under 35 U.S.C. 154(b) by 0 days.

(21) Appl. No.: 10/152,120

(22) Filed: May 21, 2002

(65) Prior Publication Data

US 2002/0177029 A1 Nov. 28, 2002

(30) Foreign Application Priority Data

May 25, 2001 (JP) .......................... 2001-156801

(51) Int. Cl.[7] .......................... H01M 8/02; H01M 8/10; H01M 8/12; H01M 8/24; H01M 4/86
(52) U.S. Cl. ............................... 429/38; 429/40
(58) Field of Search ............................. 429/32, 38, 40, 429/33

(56) References Cited

U.S. PATENT DOCUMENTS

| | | | | |
|---|---|---|---|---|
| 4,699,853 A | * | 10/1987 | Okada et al. | 429/37 |
| 5,252,410 A | * | 10/1993 | Wilkinson et al. | 429/33 |
| 6,042,955 A | * | 3/2000 | Okamoto | 429/13 |

* cited by examiner

Primary Examiner—Patrick Ryan
Assistant Examiner—Gregg Cantelmo
(74) Attorney, Agent, or Firm—Paul & Paul

(57) ABSTRACT

A fuel cell comprising a container having a gas inlet and a gas outlet, and a multi-element stack contained in the container and made up of two or more elements for the fuel cell, the element comprising an electrolyte layer, a cathode layer, and an anode layer, with the electrolyte layer being interposed between the cathode and anode layers, and a mixed gas of a fuel gas and an oxygen-containing gas being fed to the fuel cell from the gas inlet, wherein the multi-element stack is formed of the elements stacked in such a manner that the cathode layer of one element is in direct contact to the anode layer of another element, and each of the electrolyte, cathode, and anode layers has a passage through which the mixed gas passes. A multi-element stack for such a fuel cell is also disclosed.

27 Claims, 6 Drawing Sheets

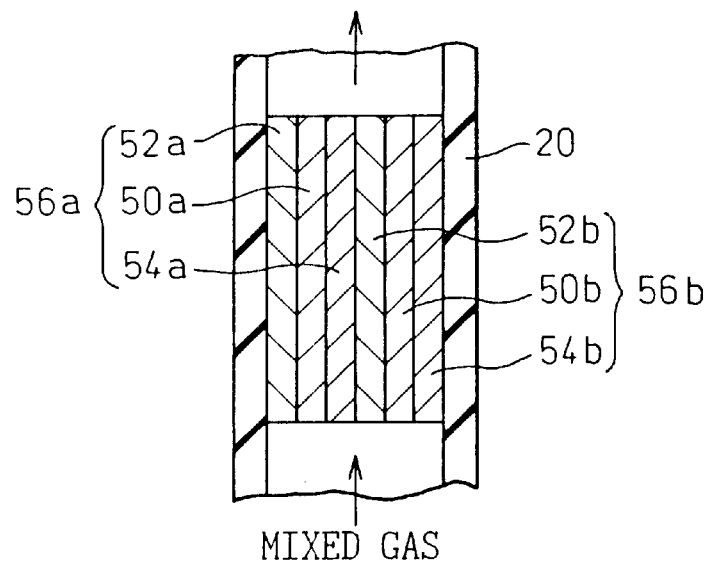
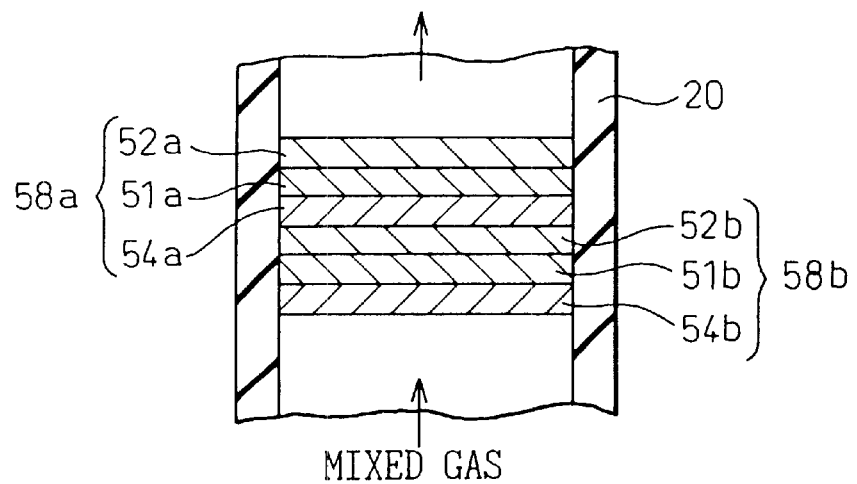

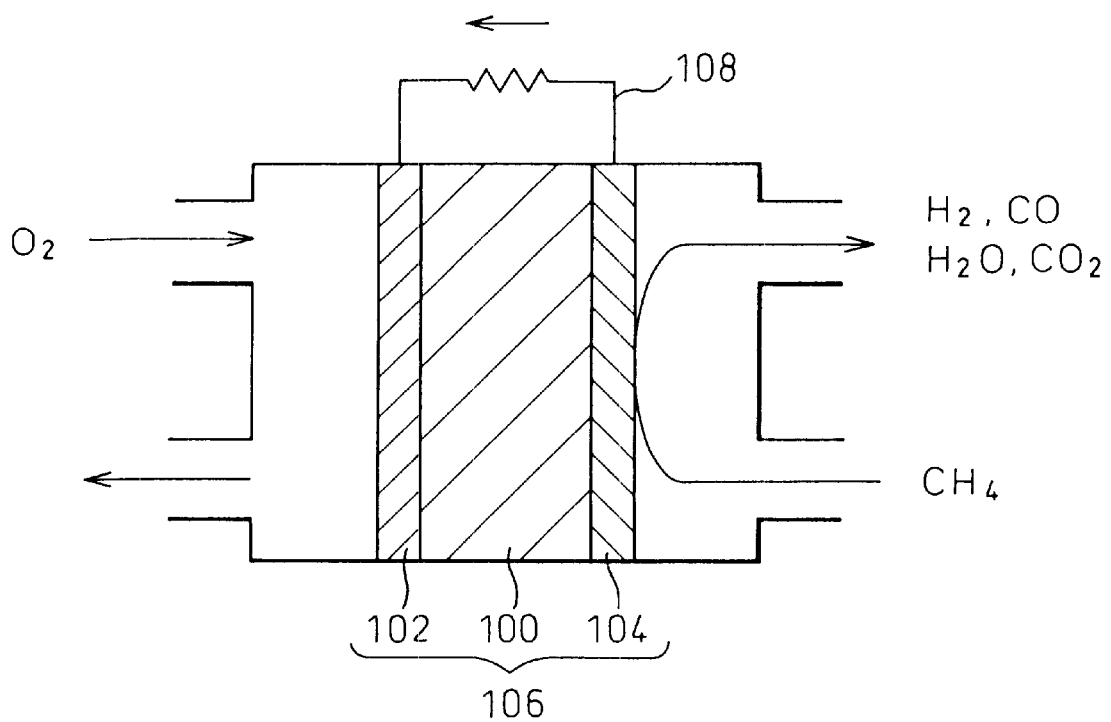

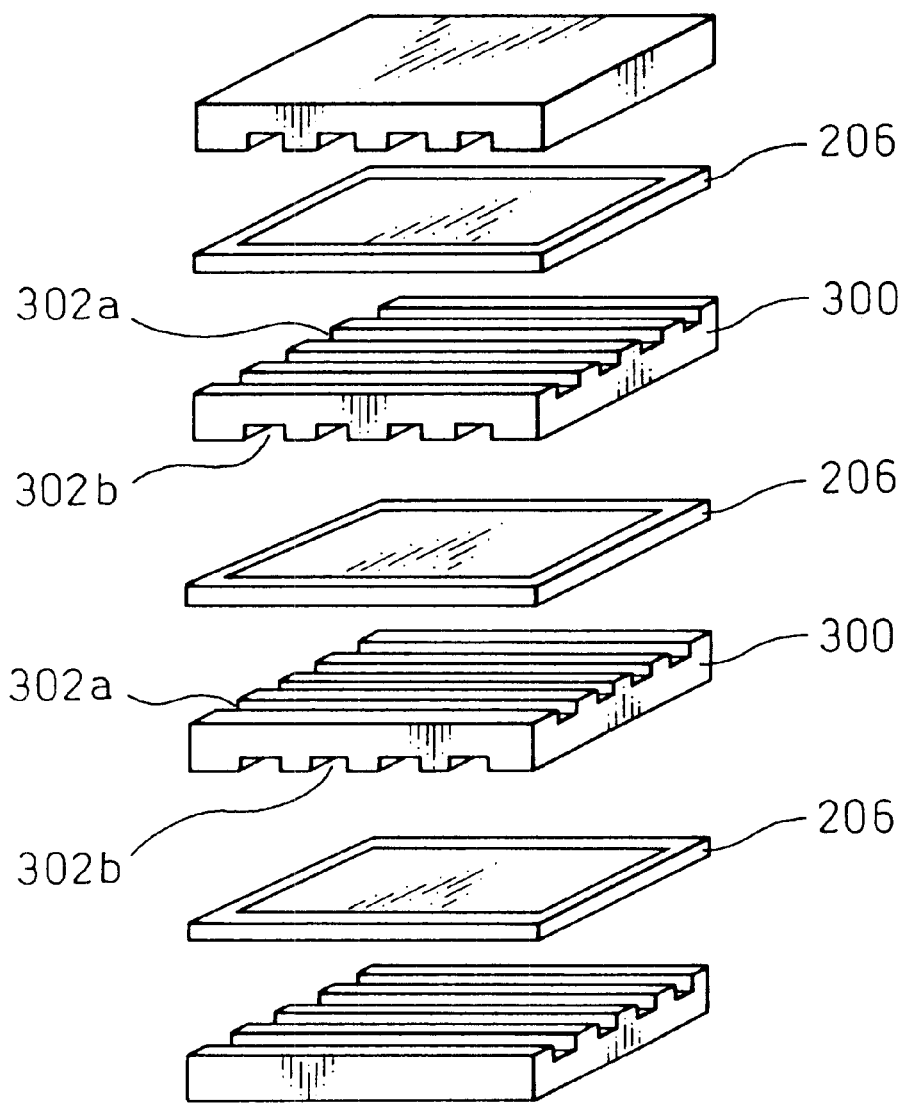

FUEL CELL AND MULTI-ELEMENT STACK THEREFOR

BACKGROUND OF THE INVENTION

1. Field of the Invention

The invention relates to a fuel cell and an element for the fuel cell and, more particularly, to a fuel cell to which a mixed gas containing a fuel gas, such as methane, and oxygen is fed and to a multi-element stack for the fuel cell.

2. Description of the Related Art

A fuel cell can be expected to have a high efficiency of power generation compared to power generation in a thermal power plant, and is currently being studied by many researchers.

As shown in FIG. 6, such a conventional fuel cell is provided with an element 106 for the fuel cell, which element uses, as a solid electrolyte layer 100 of an oxygen ion conduction type, a fired body made of stabilized zirconia to which yttria ($Y_2O_3$) is added, the solid electrolyte layer 100 having one side on which a cathode layer 102 is formed, and another side on which an anode layer 104 is formed. Oxygen or an oxygen-containing gas is fed to the side of cathode layer 102 of the fuel cell element 106, and a fuel gas, such as methane, is fed to the side of anode layer 104.

The oxygen ($O_2$) fed to the side of cathode layer 102 of the fuel cell element 106 is ionized into oxygen ions ($O^{2-}$) at the boundary between the cathode layer 102 and the solid electrolyte layer 100, and the oxygen ions are conducted to the anode layer 104 by the electrolyte layer 100. The oxygen ions conducted to the anode layer 104 react with the methane ($CH_4$) gas fed to the side of anode layer 104, to thereby form water ($H_2O$), carbon dioxide ($CO_2$), hydrogen ($H_2$), and carbon monoxide (CO). During the reaction, the oxygen ions release electrons, resulting in a potential difference between the cathode layer 102 and the anode layer 104. Accordingly, by establishing an electrical connection between the cathode layer 102 and the anode layer 104 by a lead wire 108, the electrons of the anode layer 104 pass in the direction toward the cathode layer 102 (the direction of the arrow in the drawing) through the lead wire 108, and electricity can be produced by the fuel cell.

The fuel cell shown in FIG. 6 is operated at a temperature of about 1000° C. At such a high temperature, the side of cathode layer 102 of the fuel cell is exposed to an oxidizing atmosphere, and the side of anode layer 104 is exposed to a reducing atmosphere. Consequently, it has been difficult to enhance the durability of the element 106.

It is reported, in Science, vol. 288, pp2031–2033 (2000), that, as shown in FIG. 7, even when a fuel cell element 206 made up of a solid electrolyte layer 200, and a cathode layer 202 and an anode layer 204 respectively formed on one side and another side of the electrolyte layer 200, is placed in a mixed gas atmosphere of methane and oxygen, the fuel cell element 206 develops an electromotive force.

By placing the element 206 in a mixed gas atmosphere, as above, the element 206 can be enveloped as a whole in substantially the same atmosphere, and can have improved durability compared to the element 106 shown in FIG. 6, in which the respective sides of the element 106 are exposed to atmospheres different from each other.

Nevertheless, the fuel cell shown in FIG. 7 has only a single element for the fuel cell (or fuel cell element) 206 contained in a container 210, so that the voltage which can be taken out of the fuel cell is low.

To obtain a desired level of voltage from a fuel cell using the type of an element illustrated in FIG. 7, a multi-element stack comprising a plurality of fuel cell elements 206, as shown in FIG. 8, is used. In the multi-element stack, the fuel cell elements 206 are separated from each other by a separator 300 provided with complex gas passages 302a, 302b, which make, in turn, the structure of the fuel cell complicated. In addition, in such a complicated fuel cell, it is difficult to make the respective members have equivalent properties, such as a coefficient of thermal expansion, at an operation temperature of the cell, and the members tend to be largely effected by a thermal stress.

SUMMARY OF THE INVENTION

It is an object of the invention to provide a fuel cell using a mixed gas containing a fuel gas, such as methane, and oxygen, which gas a simple structure and from which a desired level of voltage can be obtained, and a multi-element stack for the fuel cell.

To this end, the inventors found that a fuel cell using a multi-element stack having a simple structure, in which a plurality of fuel cell elements, such as those shown in FIG. 7, are stacked without the use of separators, can have a simple structure, and can provide a desired level of voltage.

Thus, the invention resides in a fuel cell comprising a container having a gas inlet and a gas outlet, and a multi-element stack contained in the container and made up of two or more elements for the fuel cell, the element comprising an electrolyte layer, a cathode layer, and an anode layer, with the electrolyte layer being interposed between the cathode and anode layers, and a mixed gas of a fuel gas and an oxygen-containing gas being fed to the fuel cell from the gas inlet, wherein the multi-element stack is formed of the elements stacked in such a manner that the cathode layer of one element is in direct contact to the anode layer of another element, and each of the electrolyte, cathode, and anode layers has a passage through which the mixed gas passes.

The invention also resides in a multi-element stack for a fuel cell to which a mixed gas of a fuel as and an oxygen-containing gas is fed, the multi-element stack being made up of two or more elements, the element comprising an electrolyte layer, a cathode layer, and an anode layer, with the electrolyte layer being interposed between the cathode and anode layers, wherein the multi-element stack is formed of the elements stacked in such a manner that the cathode layer of one element is in direct contact with the anode layer of another element, and each of the electrolyte, cathode, and anode layers has a passage through which the mixed gas passes.

In the fuel cell according to the invention, at least a part of the outer surfaces of the multi-element stack is in intimate contact with the inner surface of the container, and/or the gap between the outer surface of the multi-element stack and the inner surface of the container is sealed. This makes it possible to allow the mixed gas fed to the cell to certainly pass through the multi-element stack without bypassing it, leading to the lowered running cost of the fuel cell.

In the invention, at least one of the electrolyte, cathode, and anode layers may be porous. It is preferred that the cathode and anode layers are porous, and the electrolyte layer is solid, and has a hole piercing through it from one side to the other side of the electrolyte layer, whereby the mixed gas can pass from the gas inlet to the gas outlet through the pores in the cathode and anode layers and the hole in the electrolyte layer. In this case, the cathode and anode layers may further have a shaped passage for the mixed gas, the shaped passage having a size larger than the diameter of the pores in the cathode and anode layers.

It is also preferred that the electrolyte, cathode, and anode layers are porous, so that the mixed gas can pass from the gas inlet to the gas outlet through the pores in these layers.

Preferably, the porous layers have an open porosity of equal to or greater than 20%, more preferably 30 to 70%, and most preferably 40 to 50%.

Preferably, the electrolyte layer is formed of a zirconium oxide (zirconia) which is partially stabilized by an element of group III of the periodic table, such as yttrium (Y) or scandium (Sc), or a cerium oxide which is doped with an element such as lanthanide, for example, samarium (Sm) or gadolinium (Gd).

Also preferably, the cathode layer is formed of a manganite, gallate or cobaltite compound of lanthanum to which an element of group III of the periodic table, such as strontium (Sr), is added.

Also preferably, the anode layer is formed of a body supporting nickel cermet or platinum to which 10 to 30% by weight of an electrolyte forming the solid electrolyte layer $10a$, $10b$ is added.

Preferably, the mixed gas is selected from hydrogen, methane, ethane, propane, butane, and mixtures thereof, and the oxygen-containing gas is oxygen or air.

BRIEF DESCRIPTION OF THE DRAWINGS

The above and other objects and advantages of the invention will be well understood and appreciated by a person with ordinary skill in the art, from consideration of the following detailed description made by referring to the attached drawings, wherein:

FIGS. 5A and 5B illustrate still other embodiments of the fuel cell according to the invention;

FIG. 6 illustrates a fuel cell of the prior art;

FIG. 8 is an exploded perspective view of a multi-element stack used in the type of fuel cell illustrated in FIG. 7.

DETAILED DESCRIPTION OF THE INVENTION

Figure 1:
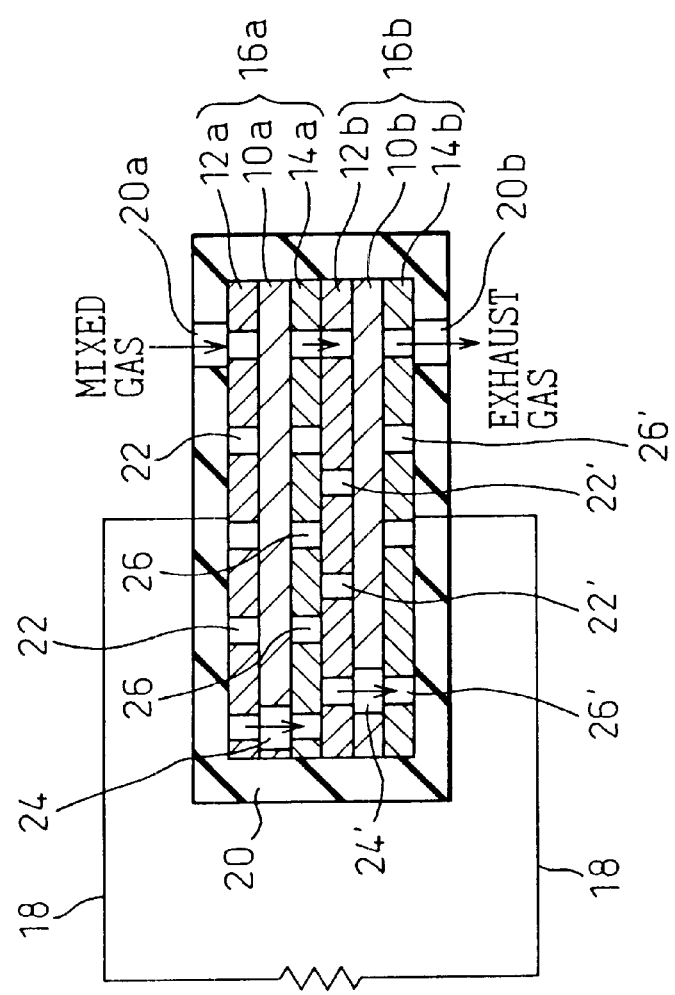
FIG. 1A is a schematic sectional view of an embodiment of the fuel cell according to the invention.
FIG. 1B is a plan view of a cathode layer in the fuel cell shown in FIG. 1A.

FIG. 1A schematically shows an embodiment of the fuel cell according to the invention. This fuel cell comprises a container 20 having a rectangular, circular or the like cross-section and having a gas inlet $20a$ and a gas outlet $20b$, and a multi-element stack contained in the container 20 and made up of two fuel cell elements $16a$ and $16b$. A mixed gas containing a fuel gas, such as methane, and oxygen is fed to the fuel cell from the gas inlet $20a$, and an exhaust gas is discharged from the fuel cell through the gas outlet $20b$. The fuel cell may comprise a desired number of elements dependent on a desired level of voltage which the fuel cell is required to produce, in such a manner that the mixed gas fed from the gas inlet $20a$ cannot bypass the stack of elements and be discharged through the gas outlet $20b$ without being used to generate electricity. In other words, the stack of fuel cell elements, i.e., a multi-element stack according to the invention, is contained in the container 20 in such a manner that all or at least part of the outer surfaces of the multi-element stack is brought into intimate contact with the inner surfaces of the container 20, and the mixed gas fed into the container 20 is prevented from passing the gaps between the container inner surfaces and the multi-element stack outer faces. A material having a low porosity, such as alumina cement or higher melting-point glass, may be provided to seal the gap between the container inner surfaces and the multi-element stack outer faces, as required.

The container 20 is formed of a thermal resistant material, such as a ceramic, capable of withstanding a temperature of up to 1200° C., so as to show sufficient thermal resistance at an operating temperature of the fuel cell.

Each of the elements $16a$, $16b$ forming the multi-element stack according to the invention comprises a solid electrolyte layer $10a$ (or $10b$) having a dense structure, and a porous cathode layer $12a$ (or $12b$) and a porous anode layer $14a$ (or $14b$) formed on the respective sides of the solid electrolyte layer $10a$ (or $10b$). The anode layer $14a$ of the element $16a$ is directly joined to the cathode layer $12b$ of the adjacent element $16b$, to thus form the multi-element stack. A leader line 18 is connected to each of the outermost layers, i.e., the cathode layer $12a$ of the element $16a$ and the anode layer $14b$ of the element $16b$, of the multi-element stack, to take out electricity generated by the fuel cell.

The solid electrolyte layer $10a$, $10b$ used to constitute each of the elements $16a$ and $16b$ is an oxygen ion conductor, and is formed of a zirconium oxide (zirconia) which is partially stabilized by an element of group III of the periodic table, such as yttrium (Y) or scandium (Sc), or a cerium oxide which is doped with an element such as lanthanide, for example, samarium (Sm) or gadolinium (Gd).

The cathode layers $12a$, $12b$ are formed of manganite, gallate or cobaltite compound of lanthanum to which an element of group III of the periodic table, such as strontium (Sr), is added, and the anode layers $14a$, $14b$ are formed of a body supporting nickel cermet or platinum to which 10 to 30% by weight of an electrolyte forming the solid electrolyte layer $10a$, $10b$ is added.

The electrolyte layer $10a$, $10b$, the cathode layers $12a$, $12b$ and the anode layers $14a$, $14b$ contained in the container 20 respectively have passages formed therein through which a mixed gas, fed to the fuel cell, can pass.

The cathode layers $12a$, $12b$ have, as passages, pores (not shown) of the porous cathode layer itself, and a slit or channel 22, 22' having a size larger than the size (or diameter) of the pore. FIG. 1B shows a plan view of the cathode layer $12a$, and illustrates such a slit 22 having a winding or zigzag configuration, which is formed so as to pass the mixed gas along the top face of the electrolyte layer $10a$. The slit 22 has a starting end $22a$, to which a mixed gas is fed through the gas inlet $20a$ of the container 20, and from which the mixed gas commences to flow along the slit 22, and a terminal end $22b$, at which the mixed gas leaves the cathode layer $12a$. The cathode layer $12b$ also has pores of the cathode layer itself and a slit 22, which is similar to that illustrated in FIG. 1B.

The electrolyte layers $10a$, $10b$ is provided with a piercing hole 24, 24', through which the mixed gas having passed through the pores and the slit of the cathode layer 12a, 12b can travel to the anode layer 14a, 14b.

The anode layers 14a, 14b have, as passages, pores (not shown) of the porous anode layer itself, and a slit or channel having a size larger than the size (or diameter) of the pore. The slit in the anode layers 14a, 14b has a winding or zigzag configuration, which is analogous to the slit 22 of the cathode layer 12a shown in FIG. 1B, and is formed so as to pass the mixed gas along the bottom face of the electrolyte layer 10a, 10b. The slit of the anode layer 14a, 14b has a starting end, to which the mixed gas is fed through the piercing hole 24, 24' of the solid electrolyte layer 10a, 10b, and from which the mixed gas commences to flow along the slit, and a terminal end, at which the mixed gas leaves the anode layer 14a, 14b.

In the fuel cell shown in FIG. 1A, the mixed gas fed to the fuel cell through the inlet 20a flows through the slits of the respective cathode and anode layers in sequence, in the direction of the arrows indicated in FIG. 1A, and is discharged from the outlet 20b, as exhaust gas.

The multi-element stack for the fuel cell shown in FIG. 1A does not use extra members such as the separator 300 used in a prior fuel cell. Thus, according to the invention, the multi-element stack can have a simplified structure and a small thickness, and can give the fuel cell using the multi-element stack a simplified structure.

Figure 7:
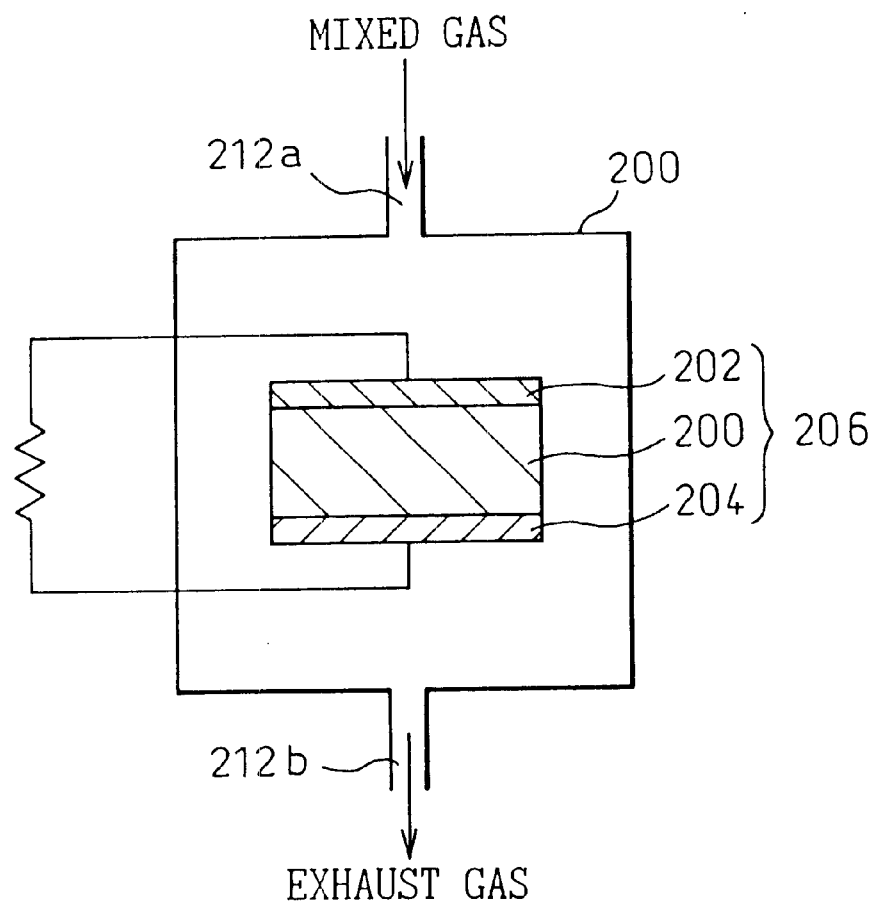
FIG. 7 illustrates a new type of fuel cell recently reported.

In the fuel cell shown in FIG. 1A, the multi-element stack is contained, in the container 20, such that the outer surfaces of the multi-element stack are brought into intimate contact with the inner surfaces of the container 20. Accordingly, the mixed gas fed into the container 20 passes the slit-like passages provided in the respective cathode and anode layers without bypassing the multi-element stack before being discharged from the fuel cell. Thus, the fuel cell shown in FIG. 1A can effectively use the mixed gas fed to the container 20, compared to the prior fuel cell shown in FIG. 7.

Part of the mixed gas fed to the fuel cell according to the invention diffuses into the pores of the cathode and anode layers 12a, 12b, 14a, 14b during passing through the slit-like passages 22, 22', 26, 26' provided in the cathode and anode layers, and reaches the surface of the solid electrolyte layers 10a, 10b. A combustible gas, such as methane, of the mixed gas reached the surface of the solid electrolyte layer 10a, 10b electrochemically reacts with oxygen ions having passed through the solid electrolyte layer 10, to form water ($H_2O$), carbon dioxide ($CO_2$), hydrogen ($H_2$), and carbon monoxide (CO), while electrons are released from the oxygen ions. As the mixed gas travels along the slit-like passages in the multi-element stack, it is decreased in the amount of oxygen, and is increased in the amounts of water, carbon dioxide, hydrogen, and carbon monoxide. The water, carbon dioxide, hydrogen, and carbon monoxide thus formed are discharged from the gas outlet 20b.

As the mixed gas fed to the fuel cell, a mixed gas of a combustible gas, such as hydrogen, methane, ethane, propane, or butane, or a mixture thereof, and air is preferably used. In general, the mixed gas is prepared so as to have a concentration out of the flammable limit of a combination of combustible gas and oxygen (or air) used. The mixed gas may be fed to the fuel cell from the outermost anode layer 12a side, as illustrated in FIG. 1A, or may be fed from the outer most cathode layer 14b side.

The fuel cell elements 16a, 16b shown in FIG. 1A can be fabricated by placing green sheets for the cathode layer and the anode layer on the respective sides of a pre-fired solid electrolyte layer, or applying pastes for the cathode layer and the anode layer to the respective sides of a pre-fired solid electrolyte layer, and firing the assembly of the green sheets or pastes and the pre-fired solid electrolyte layer together. The green sheets or pastes are designed to provide the cathode and anode layers with a predetermined pattern for the slit-like passage.

The multi-element stack made up of a certain number of fuel cell elements can be obtained by stacking a necessary number of assemblies of the green sheets or pastes and the pre-fired solid electrolyte layer, and firing them together. Alternatively, the multi-element stack may be obtained by stacking a necessary number of fired assemblies to thereby integrate them.

In the multi-element stack shown in FIG. 1A, the anode layer 14a of the upper element 16a has a slit-like passage 26 for a mixed gas which is separated from the slit-like passage 22' of the adjacent cathode layer 12b of the lower element 16b. The slit-like passage 26 of the anode layer 14a of the upper element 16a may communicate with slit-like passage 22' of the cathode layer 12b of the lower element 16b, as illustrated in FIG. 2.

Figure 2:
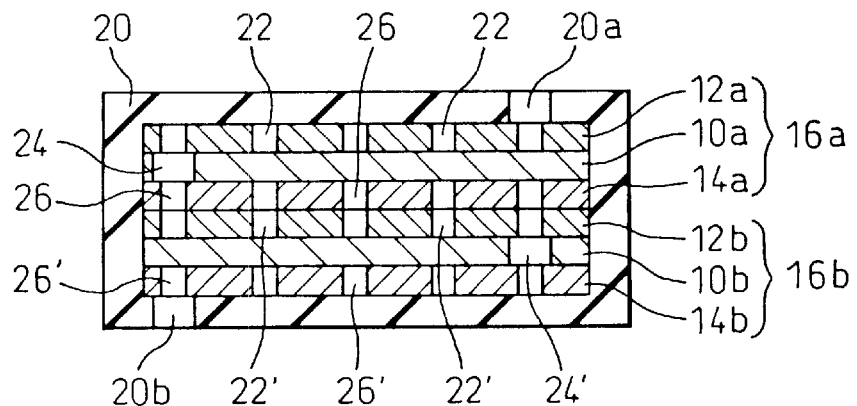
FIG. 2 is a schematic sectional view of another embodiment of the fuel cell of the invention.
Figure 3:
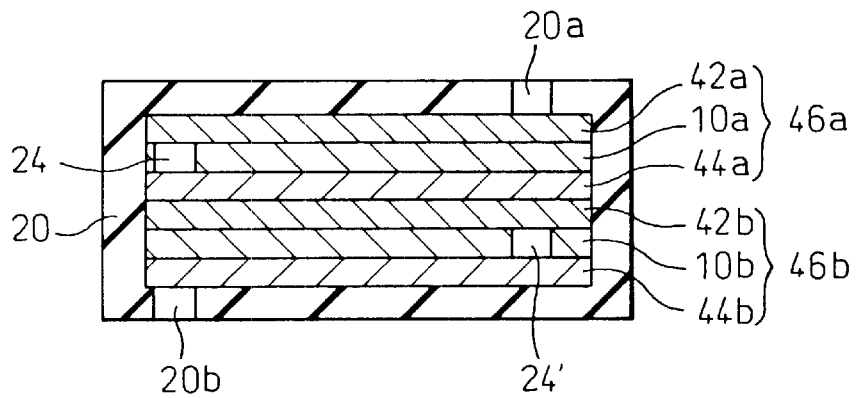
FIG. 3 is a schematic sectional view of a further embodiment of the fuel cell of the invention.

In the multi-element stack shown in FIGS. 1A and 2, the cathode layers 12a, 12b and the anode layers 14a, 14b have the slit-like passage 22, 22', 26, 26' for a mixed gas. However, since the cathode layers as well as anode layers are porous, they may have no shaped passages, such as those illustrated in FIGS. 1A and 2, as shown in FIG. 3. In this case, it is preferred that the porous cathode layers 42a, 42b and anode layers 44a, 44b in the fuel cell of FIG. 3 have an open porosity of equal to or greater than 20%, more preferably 30 to 70%, and most preferably 40 to 50%.

On the other hand, since the solid electrolyte layers 10a, 10b are dense structures, they have a piercing holes 24, 24' for passing the mixed gas from the layer (cathode or anode layer) on the one side of the electrolyte layer to the layer (anode or cathode layer) on the other side, as illustrated in FIG. 3. Thus, the mixed gas having passed the pores of the cathode layer 42a, 42b is fed to the anode layer 44a, 44b through the piercing hole 24, 24' of the solid electrolyte layer 10a, 10b.

Figure 4:
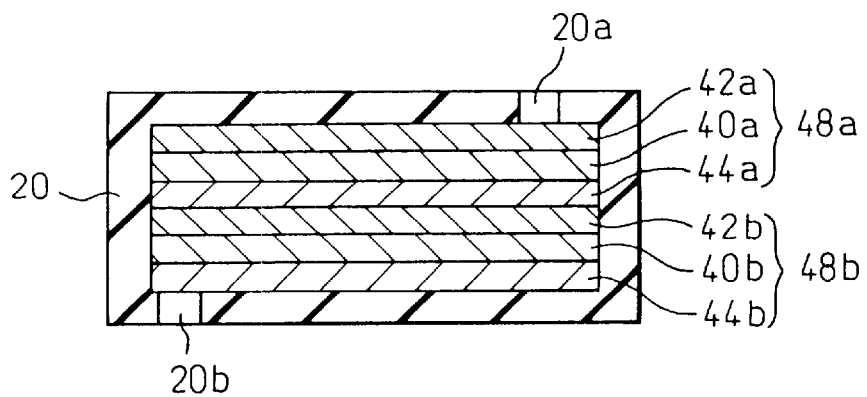
FIG. 4 is a schematic sectional view of a still further embodiment of the fuel cell of the invention.

As shown in FIG. 4, the fuel cell according to the invention may comprise a multi-element stack in which each of elements 48a, 48b is made up of an electrolyte layer 40a, 40b, a cathode layer 42a, 42b, and an anode layer 44a, 44b, which are all porous. Thus, the respective layers in this fuel cell include pores as passages for a mixed gas, so that they do not need to have a shaped passage for a mixed gas, such as a slit-like passage in the fuel cell shown in FIG. 1A, as well as a piercing hole for passing the mixed gas from one side of the electrolyte layer to other side. It is preferred that the respective layers in the fuel cell of this embodiment have an open porosity of equal to or greater than 20%, more preferably 30 to 70%, and most preferably 40 to 50%.

The multi-element stack shown in FIGS. 3 and 4 can be obtained by making an assembly of green sheets for the respective layers, and firing the assembly to thereby simultaneously fire the layers. This method is cost effective compared to the method for producing the multi-element stack shown in FIGS. 1A and 2 in which green sheets for the cathode layer and the anode layer are placed on the respective sides of a pre-fired solid electrolyte layer, or pastes for the cathode layer and the anode layer are applied to the respective sides of a pre-fired solid electrolyte layer, the green sheets or pastes being designed to provide the cathode and anode layers with a predetermined pattern for the slit-like passage, and the assembly of the green sheets or pastes and the pre-fired solid electrolyte layer is then fired together.

Although substantially all of the outer surfaces of the multi-element stack in the embodiments earlier described is brought into intimate contact with the inner surfaces of the container, the multi-element stack according to the invention may be contained in a container so that part of the outer surfaces of the multi-element stack is not brought into contact with the inner surfaces of the container, when the elements of the multi-element stack are made up exclusively of porous cathode, electrolyte, and anode layers.

In the fuel cell shown in FIG. 5A, the element 56a, 56b is made up of the solid electrolyte layer 50a, 50b, the porous cathode layer 52a, 52b, and the porous anode layer 54a, 54b, and the multi-element stack comprises two elements 56a and 56b. In this embodiment, the cathode layer 52a of the left element 56a and the anode layer 54b of the right element 56b is in contact with the inner surfaces of the container 20, and the top and bottom sides of the multi-element stack shown in the drawing are not in contact with the inner surface of the container 20. In this fuel cell, a mixed gas flows in the direction parallel to the respective layers 50a, 50b, 52a, 52b, 54a, 54b of the stack, and fed to the multi-element stack at its bottom side where the layers 50a, 50b, 52a, 52b, 54a, 54b of the stack are exposed. The mixed gas having reached the bottom side of the stack travels within the cathode layers 52a, 52b and the anode layers 54a, 54b along the solid electrolyte layers 50a, 50b, while developing chemical reaction with oxygen ions, and is then discharged from the top side of the stack.

In the fuel cell shown in FIG. 5B, the elements 58a, 58b made up of the electrolyte layer 51a, 51b, the cathode layer 52a, 52b, and the anode layer 54a, 54b, all of which is made porous, are used to form the multi-element stack. In this embodiment, the multi-element stack is contained in the container 20, so that the sides of the stack, where the layers 51a, 51b, 52a, 52b, 54a, 54b of the stack are exposed, are in contact with the inner surfaces of the container 20, and the outermost cathode layer 52a and anode layer 54b of the stack is not in contact with the inner surface of the container 20. A mixed gas flows in the direction perpendicular to the respective layers 51a, 51b, 52a, 52b, 54a, 54b of the stack, and is fed to the multi-element stack at its bottom side where the anode layer 54b of the stack is exposed. The mixed gas fed travels within the cathode layers 52a, 52b and the anode layers 54a, as well as the electrolyte layers 50a, 50b, while developing a chemical reaction with oxygen ions, and is then discharged from the outermost cathode layer 52a of the stack.

Referring to FIG. 5A again, it could be understood that porous electrolyte layers, such as those illustrated in FIG. 5B, may be used in place of the solid electrolyte layers 50a, 50b.

By way of example, a multi-element stack and a fuel cell using the multi-element stack will now be described for better understanding of the invention.

Powder of $La_{0.8}Sr_{0.2}MnO_3$ was ground and mixed in a wet ball mill, and was then formed into a green sheet for a cathode layer by a doctor blade process. Powder of $Sm_{0.2}Ce_{0.8}O_{1.9}$ was also ground and mixed in a wet ball mill, and was then formed into a green sheet for an electrolyte layer by a doctor blade process. Further, powder of NiO, to which powder of $Sm_{0.2}Ce_{0.8}O_{1.9}$ was added in an amount of 20% by weight, was ground and mixed in a wet ball mill, and was then formed into a green sheet for an anode layer by a doctor blade process.

The green sheets for anode, electrolyte and cathode layers were laminated in that sequence, and the lamination process was then repeated twice, to thereby form a laminate of nine green sheets. The laminated green sheets were then thermo-compression bonded together, and the bonded laminate was divided into separate laminate pieces of about 5×5 millimeters. The pieces were fired in air at 1100° C. to provide multi-element stacks for fuel cell. The multi-element stack thus obtained had three fuel cell elements each comprising porous anode, cathode, and electrolyte layers.

A platinum wire was connected to each of the outermost anode and cathode layers of the multi-element stack. The stack was then heated in a mixed gas of air and butane at about 600° C. and, as a result, an open-circuit potential of about 1 volt was observed.

On the other hand, the green sheets for anode, electrolyte and cathode layers were laminated to produce a laminate of three green sheets, and the laminate was processed as described above, to provide an element of three layers (cathode, electrolyte, and anode layers). A platinum wire was then connected to each of the cathode and anode layers of the element. The element was then heated in a mixed gas of air and butane at about 600° C. and, as a result, an open-circuit potential of about 0.2 volt was observed.

Thus, it was verified that the multi-element stack gained a high electric potential by the series connection of elements.

As described, the multi-element stack according to the invention is made up of a plurality of fuel cell elements directly joined to each other without a separator, and can be simplified and be designed to have a small thickness. In addition, by the use of porous materials, it is relatively easy for the multi-element stack of the invention to employ members having equivalent coefficients of thermal expansion at an operating temperature of the fuel cell using it, and to make effects of a thermal stress on the members as small as possible.

The fuel cell of the invention using such a multi-element stack can also be simplified and be designed to have a small thickness.

What is claimed is:

1. A fuel cell comprising a container having a gas inlet and a gas outlet, and a multi-element stack contained in the container and made up of two or more elements for the fuel cell, each element comprising an electrolyte layer, a cathode layer, and an anode layer, with the electrolyte layer being interposed between the cathode and anode layers, and a mixed gas of a fuel gas and an oxygen-containing gas being fed to the fuel cell from the gas inlet, wherein the multi-element stack is formed of the elements stacked in such a manner that the cathode layer of one element is in direct contact to the anode layer of another element, and each of the electrolyte, cathode, and anode layers has a passage through which the mixed gas passes.

2. The fuel cell of claim 1, wherein at least part of outer surfaces of the multi-element stack is in intimate contact with inner surface of the container, and/or a gap between an outer surface of the multi-element stack and the inner surface of the container is sealed.

3. The fuel cell of claim 2, wherein at least one of the electrolyte, cathode, and anode layers is porous.

4. The fuel cell of claim 3, wherein the cathode and anode layers are porous, and the electrolyte layer is solid and has a hole piercing through it from one side to the other side of the electrolyte layer, and wherein the mixed gas passes from the gas inlet to the gas outlet through the pores in the cathode and anode layers and the hole in the electrolyte layer.

5. The fuel cell of claim 4, wherein the cathode and anode layers further have a shaped passage for the mixed gas, the shaped passage having a size larger than a diameter of the pores in the cathode and anode layers.

6. The fuel cell of claim 3, wherein the electrolyte, cathode, and anode layers are porous, and the mixed gas passes from the gas inlet to the gas outlet through the pores in these layers.

7. The fuel cell of claim 4, wherein the porous layers have an open porosity of equal to or greater than 20%.

8. The fuel cell of claim 7, wherein the open porosity is in the range of 30 to 70%.

9. The fuel cell of claim 6, wherein the porous layers have an open porosity of equal to or greater than 20%.

10. The fuel cell of claim 9, wherein the open porosity is in the range of 30 to 70%.

11. The fuel cell of claim 1, wherein the electrolyte layer is formed of a zirconia which is partially stabilized by an element of group III of the periodic table, or a cerium oxide which is doped with lanthanide.

12. The fuel cell of claim 1, wherein the cathode layer is formed of a manganite, gallate or cobaltite compound of lanthanum to which an element of group III of the periodic table is added.

13. The fuel cell of claim 1, wherein the anode layer is formed of a body supporting nickel cermet or platinum to which an electrolyte selected from the group consisting of zirconias which are partially stabilized by an element of group III of the periodic table and cerium oxides which are doped with lanthanide.

14. The fuel cell of claim 1, wherein the mixed gas is selected from hydrogen, methane, ethane, propane, butane, and mixtures thereof.

15. The fuel cell of claim 1, wherein the oxygen-containing gas is oxygen or air.

16. A multi-element stack for a fuel cell to which a mixed gas of a fuel gas and an oxygen-containing gas is fed, the multi-element stack being made up of two or more elements, each element comprising an electrolyte layer, a cathode layer, and an anode layer, with the electrolyte layer being interposed between the cathode and anode layers, wherein the multi-element stack is formed of the elements stacked in such a manner that the cathode layer of one element is in direct contact to the anode layer of another element, and each of the electrolyte, cathode, and anode layers has a passage through which the mixed gas passes.

17. The multi-element stack of claim 16, wherein at least one of the electrolyte, cathode, and anode layers is porous.

18. The multi-element stack of claim 17, wherein the cathode and anode layers are porous, and the electrolyte layer is solid, and has a hole piercing through it from one side to the other side of the electrolyte layer.

19. The multi-element stack of claim 18, wherein the cathode and anode layers further have a shaped passage for the mixed gas, the shaped passage having a size larger than a diameter of the pores in the cathode and anode layers.

20. The multi-element stack of claim 17, wherein the electrolyte, cathode, and anode layers are porous.

21. The multi-element stack of claim 18, wherein the porous layers have an open porosity of equal to or greater than 20%.

22. The multi-element stack of claim 21, wherein the open porosity is in the range of 30 to 70%.

23. The multi-element stack of claim 20, wherein the porous layers have an open porosity of equal to or greater than 20%.

24. The multi-element stack of claim 23, wherein the open porosity is in the range of 30 to 70%.

25. The multi-element stack of claim 16, wherein the electrolyte layer is formed of a zirconia which is partially stabilized by an element of group III of the periodic table, or a cerium oxide which is doped with lanthanide.

26. The multi-element stack of claim 16, wherein the cathode layer is formed of a manganite, gallate or cobaltite compound of lanthanum to which an element of group III of the periodic table is added.

27. The multi-element stack of claim 16, wherein the anode layer is formed of a body supporting nickel cermet or platinum to which an electrolyte selected from the group consisting of zirconias which are partially stabilized by an element of group III of the periodic table and cerium oxides which are doped with lanthanide.

* * * * *